United States Patent

Wenning et al.

Patent Number: 6,063,497
Date of Patent: May 16, 2000

[54] PULVERULENT COMPOUNDS, A PROCESS FOR THEIR PREPARATION

[75] Inventors: Andreas Wenning, Nottuln; Felix Schmitt, Herten, both of Germany

[73] Assignee: Huels Aktiengesellschaft, Marl, Germany

[21] Appl. No.: 08/891,296

[22] Filed: Jul. 10, 1997

[30] Foreign Application Priority Data

Jul. 11, 1996 [DE] Germany .................... 196 27 951

[51] Int. Cl.[7] .................. B32B 5/16; B32B 9/00; B32B 15/02; B32B 17/02; B32B 19/00; B32B 21/02

[52] U.S. Cl. .................. 428/402; 156/330; 156/331.4

[58] Field of Search .................. 424/489; 428/402; 525/111; 156/330, 331.4

[56] References Cited

U.S. PATENT DOCUMENTS 4,003,718  1/1977  Gattuso ........................... 44/63
4,510,288  4/1985  Meyer et al. .................... 525/111

*Primary Examiner*—Thurman K. Page
*Assistant Examiner*—William E. Benston, Jr.
*Attorney, Agent, or Firm*—Oblon, Spivak, McClelland, Maier & Neustadt, P.C.

[57] ABSTRACT

Pulverulent compounds of outstanding thermal stability and solvent resistance are provided which are based on epoxy resins having more than one 1,2-epoxide group and one or more hydroxyl groups in the resin molecular chain, curing agents and optionally, one or more conventional auxiliaries and additives, wherein the curing agents contain one or more polyisocyanates which are blocked with inert blocking agents and with cyclic amidines of the general formulae I and/or II

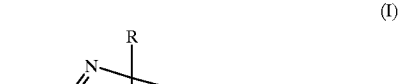

(I)

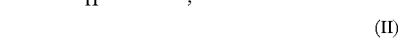

(II)

wherein R is as described herein, at an OH:NCO ratio of from 1 –0.1 to 1:1, the content of cyclic amidine in bound form is from 2 to 9% by mass, based on the epoxy resin employed, and the hardener contains from 0.9 to 0.3 mol of inert blocking agents and from 0.1 to 0.6 mol of cyclic amidines per NCO group, the preparation of these pulverulent compounds and their use as one-component adhesives.

10 Claims, No Drawings

PULVERULENT COMPOUNDS, A PROCESS FOR THEIR PREPARATION

BACKGROUND OF THE INVENTION

1. Field of the Invention

The present invention relates to compounds containing cyclic amidines and other blocking agents, to a process for their preparation, and to their use in one-component adhesive systems.

2. Discussion of the Background

The great reactivity of the epoxide group in epoxy resins allows the epoxide group to be cured with "stoichiometric" amounts of a coreactant or with catalysts. When curing with "stoichiometric" amounts, the resin and curing agent are linked to one another by way of a chemical bond.

Direct linking of the epoxy resin molecules with one another is a feature of catalytic curing, giving rise to crosslinking of the epoxy resin molecules by way of ether groups. It is initiated by means of polymerization catalysts, such as strong bases, tertiary amines, metal salts or Friedel-Crafts catalysts. For example, DE-A 27 31 335 describes a method of curing 1,2-epoxide compounds with cyclic amidines. A further hardener system for epoxy resins, which is used in about 50% of all heat-curing epoxy systems, is accelerated dicyandiamide. Based on this, one-component ("one-pack") adhesives pursue the goal of attaining high tensile shear strengths in metal bonds at room temperature. However, from temperatures of about 80–100° C., these values drop sharply.

DE-A 36 10 758 describes, for the first time, pulverulent coating compositions based on EP hardeners which bring about the full curing of bisphenol A epoxy resins by polymerization of their epoxide groups and additionally by means of reaction of their hydroxyl functions. The one-component coatings thus produced are distinguished by very good coating properties and outstanding solvent resistance. The focus of application of these systems, however, is in powder coating, since the tensile shear strengths of the powders of DE-A 36 10 758 at elevated temperatures (DIN EN 1465) are poor, rendering them unsuitable for the bonding of metals.

DE 195 49 029 describes compounds that include cyclic amidine and urethane groups and are suitable as epoxy hardeners for the bonding of metals. The bonds have very good solvent resistance. Nevertheless, the cleavage of the urethane groups that is necessary for the urethane crosslinking reaction to proceed, necessitates relatively high curing temperatures.

SUMMARY OF THE PRESENT INVENTION

Accordingly, one object of the present invention is to provide a one-component adhesive system whose curing gives rise to bonds having very good thermal stability and solvent resistance.

A further object of the present invention is to provide a one-component adhesive system that does not require the high curing temperatures conventionally found in such one-component systems.

These and other objects of the present invention have been satisfied by the discovery of a novel resin/hardener mixture, which comprises, as curing agent, one or more polyisocyanates blocked with cyclic amidines and one or more conventional inert blocking agents.

DETAILED DESCRIPTION OF THE PREFERRED EMBODIMENTS

The present invention accordingly provides pulverulent compounds of outstanding thermal stability and solvent resistance comprising an epoxy resin which is based on 1,2-epoxide compounds having more than one 1,2-epoxide group and one or more hydroxyl groups in the resin molecule, curing agents and optionally, one or more conventional auxiliaries and additives customary in adhesives technology, wherein the curing agents present comprise one or more polyisocyanates which are blocked with one or more inert blocking agents and with cyclic amidines (imidazoline) of the general formulae I and/or II

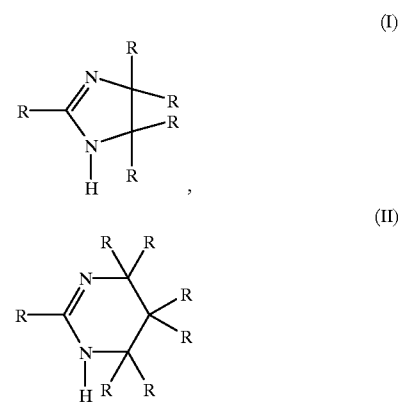

wherein each radical R is, independently, hydrogen, $C_1$–$C_{10}$ alkyl, $C_1$–$C_{10}$ cycloalkyl, $C_7$–$C_{20}$ aralkyl or $C_6$–$C_{22}$ aryl radicals, and in which, at an OH:NCO ratio of from 1:0.1 to 1:1, preferably from 1:0.3 to 1:1, the content of cyclic amidine in bound form is from 2 to 9% by weight, preferably from 3 to 8% by weight based on the epoxy resin employed, and the curing agent contains from 0.9 to 0.3 mol of inert blocking agents and from 0.1 to 0.6 mol of cyclic amines per NCO group.

The invention also provides a process for preparing the above-noted pulverulent compounds and their use in preparing one-component adhesives.

The polyisocyanates on which the present blocked polyisocyanates (hardeners) are based, and which can be employed for blocking together with the cyclic amidines and other conventional inert blocking agents, comprise any conventional polyisocyanates used in polyurethane chemistry having isocyanate groups attached to aliphatic, cycloaliphatic and/or aromatic structures. Suitable examples include those polyisocyanates, especially diisocyanates, described in Houben-Weyl, Methoden der organischen Chemie (Methods of organic Chemistry), Vol. 14/2, pp. 61 to 70 or in Liebigs Annalen der Chemie 562, pp. 75 to 136 both of which are hereby incorporated by reference. Particular preference is given in general to the (cyclo)aliphatic diisocyanates, and the aliphatic diisocyanates which are readily obtainable industrially, such as 1,6-diisocyanatohexane (HDI), 2,2,4- and 2,4,4-trimethyldiisocyanatohexane (TMDI), 1-isocyanato-3,5,5-trimethyl-3-isocyanatomethylcyclohexane (isophorone diisocyanate, abbreviated to IPDI), 3-methyl-1,5-diisocyanato-pentane (MPDI) and 4,4'-diisocyanatocyclohexylmethane (HMDI).

The term polyisocyanates in the context of the present invention includes in particular those which, prior to blocking, are subjected to molecular enlargement with one of more conventional chain extenders, such as water, polyols and polyamines. In such a molecular enlargement reaction, the chain extender is preferably employed in a deficit relative to the diisocyanate. In other words, the reaction product includes on average at least two NCO groups.

Suitable polyols for use as a chain extender are described in DE-A 27 38 270, on p. 10 and include diols, such as ethylene glycol, 1,2- and 1,3-propanediol, 2,2-dimethyl-1,3-propanediol, 1,4-butanediol, 1,6-hexanediol, 2,2,4-trimethyl-1,6-hexanediol, 2,4,4-trimethyl-1,6-hexanediol, 1,7-heptanediol, 1,12-dodecanediol, 9,10-octadecene-1,12-diol, thiodiglycol, 1,18-octadecanediol, 2,4-dimethyl-2-propyl-1,3-heptanediol, 1,4-butanediol, 1,4-butanediol, diethylene glycol, triethylene glycol, tetraethylene glycol, trans- and cis-1,4-cyclohexanedimethanol; triols, such as glycerol, 1,2,6-hexanetriol, 1,1,1-trimethylolpropane and 1,1,1-trimethylolethane; and tetraols, such as pentaerythritol. It is also possible to use mixtures of the abovementioned compounds.

The polyols ethylene glycol, 1, 12-dodecanediol and 1,1,1-trimethylolpropane are particularly preferred.

Preferred polyamines suitable for chain extension, include 1,2-ethylenediamine, 1,2-propylenediamine, 1,3-propylenediamine, 1,2-butylenediamine, 1,3-butylenediamine, 1,4-butylenediamine and the hexamethylenediamines, which may also carry one or more $C_1$–$C_4$ alkyl radicals. In addition it is also possible to use disecondary diamines, as are obtained, for example, in a conventional manner from the corresponding diprimary diamines by reaction with a carbonyl compound, such as a ketone or aldehyde, followed by subsequent hydrogenation, or by addition of diprimary diamines onto acrylic esters.

However, when using the simple diisocyanates, particularly those having isocyanate groups attached to aliphatic and/or (cyclo)aliphatic groups, a preferred method of molecular enlargement is by dimerization, trimerization, carbodiimidization and allophanate formation and also biuretization, as is described, for example, in DE-A 29 29 150, the contents of which are hereby incorporated by reference.

As a starting material for implementing the present process, particular preference is given to isocyanurate-group-containing derivatives of 1,6-diisocyanatohexane (HDI), of 2,2,4- and/or 2,4,4-trimethyldiisocyanatohexane (TMDI), of 1-isocyanato-3,5,5-trimethyl-3-isocyanatomethylcyclohexane (IPDI) and of 3-methyl-1,5-diisocyanatopentane (MPDI).

The cyclic amidines which are suitable for preparing the present hardeners are described in DE-A 22 48 776 and 28 35 029, and also in Beilstein, Handbook of Organic Chemistry, 23/3, V. p. 364 f (1991), in general and especially on pages 401–405 (six-membered rings). The contents of these references are hereby incorporated by reference. Mixtures can also be used.

2-Phenylimidazoline, 2-phenyl-4-methylimidazoline, 2,4-dimethylimidazoline and 2-methyl-1,4,5,6-tetrahydropyrimidine are particularly preferred cyclic amidines for use in the present invention.

Examples of inert blocking agents that can be used for blocking the present polyisocyanates include phenols, such as phenol and p-chlorophenol; alcohols, such as benzyl alcohol; oximes, such as acetone oxime, methyl ethyl ketoxime, cyclopentanone oxime, cyclohexanone oxime, methyl isobutyl ketoxime, methyl-tert-butyl ketoxime, diisopropyl ketoxime, diisobutyl ketoxime, and acetophenone oxime; N-hydroxy compounds, such as N-hydroxysuccinimide and hydroxypyridines; lactams, such as c-caprolactam; CH-acidic compounds, such as acetoacetates and malonates; amines, such as diisopropylamine; heterocyclic compounds having at least one heteroatom, such as mercaptans, piperidines, piperazines, pyrazoles, imidazoles, triazoles and tetrazoles; α-hydroxy acid esters, such as glycolic esters and hydroxamic esters, such as benzyl methacryloylhydroxamate. A compilation of conventional inert blocking agents can be found, for example, in Zeno W. Wicks, Jr., Progress in organic coatings 3 (1975) 73–79, 9 (1981) 3–28, which is hereby incorporated by reference.

Particularly preferred inert blocking agents include acetone oxime, methyl ethyl ketoxime and acetophenone oxime, ethyl acetoacetate, diethyl malonate, diisopropylamine, dimethylpyrazole, 1,2,4-triazole and benzyl methacryloyl-hydroxamate.

Acetophenone oxime is most preferred.

It is also possible to employ mixtures of two or more of these inert blocking agents.

The polyisocyanates used as hardeners in accordance with the present invention, which are blocked with the cyclic amidines of the general formula described and with one or more inert blocking agents, can be prepared by reacting the components at temperatures from 20 to 110° C., preferably from 40 to 80° C. In this reaction, the polyisocyanates, the cyclic amidines and the inert blocking agents are used in amounts such that there are from 0.9 to 0.3 mol of inert blocking agents and from 0.1 to 0.6 mol of cyclic amidine per NCO group. The reaction is generally carried out in an inert solvent, such as aromatic hydrocarbons, esters or ketones. Acetone has proven to be a particularly advantageous solvent, although a possible alternative working environment is the heat melt. The polyisocyanate is blocked by a technique similar to that employed in the preparation of blocked polyisocyanates as described in DE 27 29 704, the contents of which are hereby incorporated by reference.

In embodiments where chain extenders are used, a polyol and/or polyamine of the type mentioned above is added to a solution of the polyisocyanate in an inert solvent, at from 20 to 110° C., preferably from 40 to 80° C., and the mixture is further heated at this temperature until one NCO group has been reacted for each reactive hydrogen atom of the chain extender. For accelerating the reaction of the polyisocyanates with polyols it is possible to use a catalyst, such as a metal salt and/or metal complex in an amount of from about 0.01 to 2.0% by weight, preferably 0.02 to 0.5% by weight, based on the weight of the curable composition. A particularly preferred catalyst is dibutyltin dilaurate (DBTL). When reacting the polyisocyanate with a polyamine, the addition of a catalyst is generally unnecessary.

To prepare the present compounds, the reaction product from the 1st stage—the solution of the chain-extended polyisocyanate—is reacted in a subsequent step with the inert blocking agents and with the cyclic amidine at unchanged temperature. Here, the two compounds are preferably added in portions to the solution of the chain-extended polyisocyanate. After these additions have been completed, heating is continued until the reaction is complete. Then the solvent is removed by distillation in vacuo.

The present hardeners are compatible with OH-containing EP resins. The epoxy resin/hardener mixtures are outstandingly suitable for producing bonds at temperatures from 130 to 230° C. within a period of from 45 to 5 minutes. The bonds formed have improved tensile strength even at elevated temperatures.

To prepare the present mixtures, epoxide compounds having one or more hydroxyl groups in the molecule are suitable. These are epoxy resins obtained by reacting Bisphenol A and epichlorohydrin in a molar ratio of Bisphenol A: epichlorohydrin of (n):(n+1) where n=2–9. Particularly suitable epoxy resins are those having an epoxide equivalent weight of from about 800 to 3500 and an OH equivalent weight of from 300 to 250.

If desired, one or more additional epoxide compounds can be used, such as polyfunctional epoxides containing urethane groups. OH— and/or NH-containing oligomers or polymers, such as polyol polyacrylates, can also be used in order to increase the flexibility of the adhesive system.

In the preparation of the present adhesives, it is possible, if desired, to use additives which are customary in the coatings sector, such as adhesion promoters, levelling agents, fillers, pigments, dyes, UV stabilizers and antioxidants.

The present adhesive formulations are preferably prepared by either grinding, or homogenizing, in an inert solvent, the individual components (EP resin, optionally chain-extended polyisocyanate masked with blocking agent and cyclic amidines, and additives if desired) to mix the ingredients and extruding the mixture at from 80 to 150° C. or kneading it at from 80 to 130° C. Following homogenization in a solvent, the solvent is removed by distillation in vacuo. The room temperature homogenized mixture, as prepared by one of the above-mentioned techniques, is then ground using a mill to less than 500 µm. Within the context of the present invention, the present hardener compositions and adhesive compositions include the mixtures formed by mixing the recited components and any resulting products which occur by interaction of the components therein.

In the preparation of the binder mixture care must be taken that the cyclic amidine content (in blocked form) is from 2 to 8% by weight, preferably from 3 to 6% by weight, based on the sum of resin and hardener. In other words, the proportion of hardener must be chosen such that its cyclic amidine content is sufficient for catalytic curing of the EP resin (polymerization of the epoxide groups) without the OH groups reacting. At the same time, crosslinking of the epoxy resin is brought about by reaction of the OH groups of the resin with the isocyanate groups of the hardener which become unblocked at the curing temperature. In the course of this urethane reaction, however, the EP groups remain intact.

Application of the one-component adhesive to the substrates which are to be bonded can be performed by any conventional application method, such as, by electrostatic powder spraying, fluidized-bed sintering, electrostatic fluidized-bed sintering, melting or sieving. After the clean surface of one adherence has been coated with the present adhesive system and the other adherence has been placed on it, the bond is fixed using, for example, appropriate tools or a weight. curing preferably takes place within a period of from 45 to 5 minutes at from 130 to 230° C.

The present process can be used for bonding a wide variety of materials, including, but not limited to, metals and light metals, and nonmetallic materials, such as glass, ceramic or plastic.

The metal bonds produced by the present process are markedly different from the conventional epoxy-based, one-component metal adhesives currently on the market in terms of their thermal stability following a tensile shear test (DIN EN 1465). Moreover, the present pulverulent coatings are distinguished by outstanding resistance to aggressive solvents, such as methyl ethyl ketone.

EXAMPLES

Having generally described this invention, a further understanding can be obtained by reference to certain specific examples which are provided herein for purposes of illustration only and are not intended to be limiting unless otherwise specified.

A General Procedures for Preparing the Present Hardeners

Example A) 1

1-Octadecanol, acetophenone oxime and cyclic amidine were added in portions at about 60° C. to an approximately 65% strength acetone solution of the isocyanurate of 1-isocyanato-3,5,5-trimethyl-3-isocyanatomethylcyclohexane. The solution also contained 0.1% by weight of dibutyltin dilaurate. After all of the compounds containing active hydrogen were added, heating was continued at about 60° C. until the NCO content had fallen to <0.5%. The acetone was then removed by distillation in vacuo.

Reaction of the isocyanurate of 1-isocyanato-3,5,5-trimethyl-3-isocyanatomethylcyclohexane with acetophenone oxime and cyclic amidine in Example A) 2 took place by a process similar to that described in Example A 1).

Example A) 3

1 mol of ethylene glycol was metered over the course of about 10 minutes, with stirring, into an approximately 65% strength acetone solution of 2 mol of the isocyanurate of 1-isocyanato-3,5,5-trimethyl-3-isocyanatomethyicyclohexane. The solution also contained 0.1% by weight of dibutyltin dilaurate. The mixture was further heated at this temperature until one NCO equivalent had reacted per OH equivalent employed. Then 2.7 mol of acetophenone oxime and 1.3 mol of cyclic amidine were added in portions. After they were added, heating was continued at about 60° C. until the NCO content had fallen to <0.5%. The acetone was then removed by distillation in vacuo.

Further hardeners were prepared in Examples A) 4–6 by processes similar to those described in Example 3. In the reaction of the polyisocyanate with the polyamine in Example A) 5, it was not absolutely necessary to add a catalyst.

TABLE 1

Novel curing agents

| | Composition of the novel processes | | | | | % NCO | |
| --- | --- | --- | --- | --- | --- | --- | --- |
| Example | Polyiso-cyanate [mol] | Chain extender [mol] | Blocking agent [mol] | M.p. [° C.] | Glass transition point (DSC) [° C.] | % NCO (free) | (after heating: 180° C., 1 h) |
| A) 1 | 1[1)] | 1 HO—(CH$_2$)$_{17}$—CH$_3$ | 1.0 B 31[2)], 1.0 acetophenone oxime | 85–90 | 57 | 0.3 | 6.5 |
| A) 2 | 1[1)] | — | 0.8 B 31[2)], 2.2 acetophenone oxime | 130–133 | 83 | 0.3 | 11.1 |
| A) 3 | 2[1)] | 1 HO—CH$_2$—CH$_2$—OH | 1.3 B 31[2)], 2.7 aceto- | 148–152 | 90 | <0.1 | 8.1 |

TABLE 1-continued

Novel curing agents

| | Composition of the novel processes | | | | | | % NCO |
|---|---|---|---|---|---|---|---|
| Example | Polyiso-cyanate [mol] | Chain extender [mol] | Blocking agent [mol] | M.p. [° C.] | Glass transition point (DSC) [° C.] | % NCO (free) | (after heating: 180° C., 1 h) |
| A) 4 | 2[1)] | 1 HO—(CH$_2$)$_{12}$—OH | 1.4 B 31[2)], 2.6 aceto-phenone oxime | 133–138 | 92 | <0.1 | 7.6 |
| A) 5 | 2[1)] | 1 RHN—(CH$_2$)$_2$—NHR[3)] | 1.3 B 31[2)], 2.7 aceto-phenone oxime | 171–179 | 112 | <0.1 | 7.4 |
| A) 6 | 2[4)] | 1 HO—(CH$_2$)—CH$_2$—OH | 1.1 B 31[2)], 2.9 aceto-phenone oxime | 70–77 | 37 | <0.1 | 9.3 |

[1)]Isocyanurate of 1-isocyanato-3,5,5-trimethyl-3-isocyanatomethylcyclohexane
[2)]Vestagon B 31, Huls AG
[3)]R: —CH—(CH(CH$_3$)$_2$)$_2$
[4)]Isocyanurate of 1,6-diisocyanatohexane B Epoxy Resin In the adhesive examples below, a solid epoxy resin was used of the bisphenol A diglycidyl ether type—reaction product of bisphenol A and epichlorohydrin. According to the manufacturer it had an epoxide equivalent weight of 850–940, an epoxide value of 0.106–0.118, a hydroxyl value of 0.33 and a melting point of 80–100° C.

C Epoxy Resin Powder Adhesives

General preparation of the novel adhesives in solution

The hardener and the epoxy resin were dissolved, together if desired with additives, such as hydroxy acrylates, in an inert solvent, such as acetone. After a homogeneous and clear solution was obtained, the solvent was removed in vacuo and the resulting solid was comminuted and ground in a mill to a particle size <500 μm. The substance was subsequently dried to constant weight.

General preparation of novel adhesives in the melt

The products—hardener and epoxy resin—were kneaded, together if desired with the abovementioned additives, in a plastograph at 80–130° C. The cooled mixture of solids was subsequently ground to a particle size <500 μm.

In the case of homogenization in an extruder, the ground products were first of all mixed in dry form in an edge runner mill and then extruded at 80–150° C. After cooling, the extrudate was fractionated and ground on a mill to a particle size <500 μm.

Application of the Novel Adhesives

The present adhesive formulations were applied through a 100 μm sieve to the degreased and roughened standard steel panels (ST 1405). Alternatives to this were electrostatic powder spraying of the adhesives after grinding to a particle size of <100 μm, and application from the melt.

The bonds were produced in accordance with DIN EN 1465. The tensile shear strengths of these metal bonds, cured at different temperatures in a laboratory convection oven, are listed in Table 2.

TABLE 2

Metal bonds (DIN EN 1465) with the novel hardener/epoxy resin mixtures

| | Adhesive composition | | Curing | | Tensile shear strength (DIN EN 1465) | | |
|---|---|---|---|---|---|---|---|
| Example | NCO equivalent hardener | OH equivalent Epikote ® 1004 (Shell) | Temperature [° C.] | Time [min] | 23° C. | 100° C. | 125° C. |
| C) 1 | 1 A)1 | 1 | 200 | 15 | 20 | 11 | 4 |
| C) 2 | 1 A)2 | 1 | 200 | 15 | 13 | 12 | 4 |
| C) 3 | 1 A)2 | 2 | 180 | 30 | 15 | 8 | 3 |
| C) 4 | 1 A)2 | 3 | 180 | 30 | 16 | 7 | 3 |
| C) 5[1)] | 1 A)2 | 2 | 180 | 30 | 14 | 9 | 3 |
| C) 6[1)] | 1 A)2 | 3 | 180 | 30 | 18 | 9 | 3 |
| C) 7[2)] | 1 A)2 | 3 | 180 | 30 | 19 | 9 | 4 |
| C) 8 | 1 A)3 | 1 | 180 | 30 | 17 | 15 | 10 |
| | | | 160 | 30 | 15 | 15 | 11 |
| C) 9 | 1 A)3 | 2 | 180 | 30 | 21 | 18 | 11 |
| | | | 160 | 30 | 17 | 13 | 7 |
| C) 10 | 1 A)4 | 1 | 200 | 15 | 18 | 15 | 10 |
| C) 11 | 1 A)4 | 2 | 200 | 15 | 23 | 18 | 8 |
| | | | 180 | 30 | 23 | 14 | 6 |
| | | | 160 | 30 | 19 | 14 | 6 |
| C) 12 | 1 A)5 | 1 | 150 | 30 | 14 | 11 | 9 |
| C) 13 | 1 A)5 | 2 | 150 | 30 | 12 | 9 | 6 |

TABLE 2-continued

Metal bonds (DIN EN 1465) with the novel hardener/epoxy resin mixtures

| | Adhesive composition | | Curing | | Tensile shear strength | | |
|---|---|---|---|---|---|---|---|
| | NCO | OH equivalent | | | (DIN EN 1465) | | |
| | equivalent | Epikote ® | Temperature | Time | | | |
| Example | hardener | 1004 (Shell) | [° C.] | [min] | 23° C. | 100° C. | 125° C. |
| C) 14 | 1 A)6 | 2 | 150 | 30 | 16 | 4 | 2 |
| C) 15 | Comparison Example: AT 1 (Ciba-Geigy) | | 200 | 30 | 29 | 17 | 3 |

[1]Addition of 5% by mass of hydroxy acrylate (OHN: 80 mg of KOH/g, Rohm AG)
[2]Addition of 10% by mass of hydroxy acrylate (OHN: 89 mg of KOH/g, Rohm AG) and 5% by mass of adduct of the isocyanurate of 1-isocyanato-3,5,5-trimethyl-3-isocyanatomethylcyclohexane and 2,3-epoxy-1-propanol (EP: 11.7%, Huls AG)

This application is based on German Patent Application 196 27 951.8, filed with the German Patent Office on Jul. 11, 1996, the entire contents of which are hereby incorporated by reference.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A pulverulent compound comprising an epoxy resin having more than one 1,2-epoxide group and one or more hydroxyl groups present in the resin molecular chain, one or more curing agents and, optionally, one or more auxiliaries or additives, wherein the at least one curing agent present comprises at least one polyisocyanate which is blocked with a combination of an inert blocking agent and at least one cyclic amidine of the formulae I, II or both:

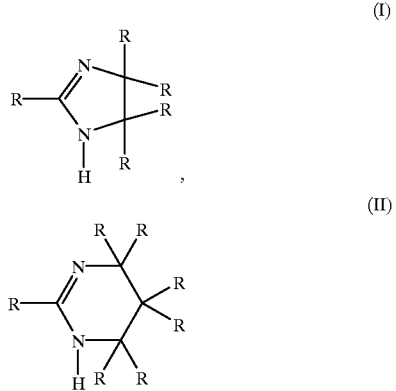

and wherein the OH (of the epoxy resin):NCO (of the at least one polyisocyanate) ratio ranges from 1:0.1 to 1:1, a content of cyclic amidine in bound form ranges from 2–9% by weight, based on the epoxy resin used, and the at least one blocked polyisocyanate is blocked with from 0.9–0.3 mol. of inert blocking agent and from 0.1–0.6 mol. of cyclic amidine per NCO group.

2. A pulverulent compound as claimed in claim 1, wherein the OH—NCO ratio is from 1:0.3 to 1:1 and the content of cyclic amidine in bound form is from 3 to 8% by weight, based on the epoxy resin employed.

3. A pulverulent compound as claimed in claim 1, wherein the epoxy resins present are those 1,2-epoxide compounds obtained by reacting bisphenol A and epichlorohydrin in a molar ratio of bisphenol A: epichlorohydrin of (n):(n+1), where n=2–9.

4. A pulverulent compound as claimed in claim 1, wherein said inert blocking agents are selected from the group consisting of acetone oxime, methyl ethyl ketoxime, acetophenone oxime, ethyl acetoacetate, diethyl malonate, diisopropylamine, dimethylpyrazole, 1,2,4-triazole and benzyl methacryloylhydroxamate.

5. A pulverulent compound as claimed in claim 4, wherein the inert blocking agent is acetophenone oxime.

6. A pulverulent compound as claimed in claim 1, wherein the one or more polyisocyanates are prepared from one of more (cyclo)aliphatic diisocyanates selected from the group consisting of 1,6-diisocyanatohexane (HDI), 2,2,4- and/or 2,4,4-trimethyldiisocyanatohexane (TMDI), 1-isocyanato-3,5,5-trimethyl-3-isocyanatomethylcyclohexane (isophorone diisocyanate, abbreviated to IPDI), 3-methyl-1,5-diisocyanatopentane (MPDI) and 4,4'-diisocyanatocyclohexyimethane (HMDI).

7. A pulverulent compound as claimed in claim 1, wherein the one or more polyisocyanates are chain extended by water, polyols, polyamines or a combination thereof.

8. A pulverulent compound as claimed in claim 1, wherein chain extension of the one or more polyisocyanates is carried out prior to blocking and by means of dimerization, trimerization, carbodiimidization, allophanate formation or biuretization.

9. A pulverulent compound as claimed in claim 1, wherein the cyclic amidine is a member selected from the group consisting of 2-phenylimidazoline, 2-phenyl-4-methylimidazoline and 2,4-dimethylimidazoline.

10. A one-component adhesive comprising the pulverulent composition as claimed in claim 1 and one or more conventional additives selected from the group consisting of adhesion promoters, levelling agents, fillers, pigments, dyes, UV stabilizers and antioxidants.

* * * * *